United States Patent
Gard et al.

(10) Patent No.: US 10,590,715 B2
(45) Date of Patent: Mar. 17, 2020

(54) THREADED TUBULAR COMPONENT AND METHOD FOR COATING SUCH A THREADED TUBULAR COMPONENT

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Eric Gard, Genay (FR); Mohamed Gouider, Caluire-et-Cuire (FR); Mikael Petit, Villefrance sur Saone (FR); Eliette Pinel, Sainte-Euphemie (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 336 days.

(21) Appl. No.: 14/369,345

(22) PCT Filed: Dec. 20, 2012

(86) PCT No.: PCT/FR2012/000541
§ 371 (c)(1),
(2) Date: Jun. 27, 2014

(87) PCT Pub. No.: WO2013/098490
PCT Pub. Date: Jul. 4, 2013

(65) Prior Publication Data
US 2014/0361530 A1  Dec. 11, 2014

(30) Foreign Application Priority Data

Dec. 29, 2011  (FR) .................................. 11 04148

(51) Int. Cl.
*E21B 17/042* (2006.01)
*F16L 58/18* (2006.01)
(Continued)

(52) U.S. Cl.
CPC .............. *E21B 17/042* (2013.01); *B05D 1/02* (2013.01); *B05D 3/007* (2013.01);
(Continued)

(58) Field of Classification Search
CPC ..................................................... E21B 17/042
(Continued)

(56) References Cited

U.S. PATENT DOCUMENTS

2004/0170848 A1* 9/2004 Ludwig .................. C09D 5/082
428/470
2004/0195825 A1* 10/2004 Anraku ................ C10M 109/02
285/94
(Continued)

FOREIGN PATENT DOCUMENTS

| CN | 101644142 A | 2/2010 |
| FR | 2 892 174 | 4/2007 |

(Continued)

OTHER PUBLICATIONS

PQ, Using Kasil 6 Potassium Silicate and PM5108 Silica Hydrogel in Inorganic, Water-Based, Zinc-Rich Coatings, Bulletin 12-32/803, p. 1-4.*
(Continued)

*Primary Examiner* — Tabatha L Penny
(74) *Attorney, Agent, or Firm* — Oblon, McClelland, Maier & Neustadt, L.L.P.

(57) ABSTRACT

A method for producing a matrix-containing dry film on a threaded tubular component for drilling or working hydrocarbon wells, by applying a mixture containing a dispersion or an aqueous emulsion of an acrylic copolymer with a
(Continued)

solution of an alkaline polysilicate in a liquid state onto a threaded end of the threaded tubular component by spraying at a temperature of from 20° C. to 40° C. thereby obtaining a threaded end coated with a film; drying the threaded end coated with the film; and densifying the film.

20 Claims, 2 Drawing Sheets

(51) Int. Cl.
    *C10M 169/04*     (2006.01)
    *F16L 15/00*     (2006.01)
    *B05D 1/02*     (2006.01)
    *B05D 3/00*     (2006.01)
    *F16L 57/06*     (2006.01)
    *F16L 58/04*     (2006.01)

(52) U.S. Cl.
CPC ......... *C10M 169/041* (2013.01); *F16L 15/00* (2013.01); *F16L 15/004* (2013.01); *F16L 57/06* (2013.01); *F16L 58/04* (2013.01); *F16L 58/182* (2013.01); *C10M 2201/0413* (2013.01); *C10M 2201/062* (2013.01); *C10M 2201/065* (2013.01); *C10M 2201/0653* (2013.01); *C10M 2201/105* (2013.01); *C10M 2201/1023* (2013.01); *C10M 2201/1053* (2013.01); *C10M 2205/143* (2013.01); *C10M 2205/16* (2013.01); *C10M 2205/163* (2013.01); *C10M 2209/0845* (2013.01); *C10M 2215/28* (2013.01); *C10M 2217/045* (2013.01); *C10M 2217/0453* (2013.01); *C10M 2229/025* (2013.01); *C10N 2230/06* (2013.01); *C10N 2240/22* (2013.01); *C10N 2250/12* (2013.01); *C10N 2270/00* (2013.01); *C10N 2280/00* (2013.01)

(58) Field of Classification Search
USPC .......................................... 427/379
See application file for complete search history.

(56) References Cited

U.S. PATENT DOCUMENTS

| 2005/0181137 | A1* | 8/2005 | Straus ..................... C23C 22/53 |
| | | | 427/376.2 |
| 2009/0220780 | A1 | 9/2009 | Bordet et al. |
| 2012/0169048 | A1 | 7/2012 | Pinel et al. |
| 2012/0312527 | A1 | 12/2012 | Pinel et al. |
| 2013/0075083 | A1 | 3/2013 | Gard et al. |
| 2013/0193682 | A1 | 8/2013 | Gard et al. |
| 2013/0320665 | A1 | 12/2013 | Gard et al. |
| 2014/0238661 | A1 | 8/2014 | Gard et al. |

FOREIGN PATENT DOCUMENTS

| FR | 2 950 667 | 4/2011 |
| FR | 2 954 454 | 6/2011 |

OTHER PUBLICATIONS

U.S. Appl. No. 14/427,370, filed Mar. 11, 2015, Gouider, et al.
U.S. Appl. No. 14/348,711, filed Mar. 31, 2014, US2014/0238661 A1, Gard, et al.
U.S. Appl. No. 13/884,717, filed Jul. 30, 2013, US2013/0320665 A1, Gard, et al.
U.S. Appl. No. 13/824,812, filed Mar. 18, 2013, US2013/0193682 A1, Gard, et al.
U.S. Appl. No. 14/316,351, filed Jun. 26, 2014, Bordet, et al.
U.S. Appl. No. 13/700,744, filed Nov. 29, 2012, US2013/0075083 A1, Gard, et al.
International Search Report dated Apr. 8, 2013 in PCT/FR12/000541 Filed Dec. 20, 2012.

* cited by examiner

THREADED TUBULAR COMPONENT AND METHOD FOR COATING SUCH A THREADED TUBULAR COMPONENT

The present invention relates to a tubular element used for drilling and/or working hydrocarbon wells, and more precisely to the threaded end of such an element. Such an end may be male or female in type and is capable of being connected to a corresponding end of an analogous element to form a joint or a connection.

The invention also relates to a threaded connection resulting from connecting two tubular elements together by makeup.

The term "tubular element intended for drilling and working hydrocarbon wells" means any element which is substantially tubular in shape intended to be connected to another element of the same type or otherwise in order to constitute, in particular, either a string for drilling a hydrocarbon well or a riser intended for maintenance (also known as a work-over riser) or for working such wells, such as a riser, or a casing string or tubing string used in working wells. The invention is also applicable to elements used in a drill string such as, for example, drill pipes, heavy weight drill pipes, drill collars and the portions of pipe connections and heavy weight pipes known as tool joints.

Each tubular component comprises an end portion provided with a male threaded zone or a female threaded zone intended to be made up with a corresponding end portion of an analogous element. Once connected, the elements compose what is termed a joint or a connection.

Such threaded tubular components of a connection are connected under defined loads in order to satisfy the requirements for an interference fit and seal imposed by the service conditions. Further, it should be known that the threaded tubular components may be required to undergo several makeup-breakout cycles, in particular when in service.

The conditions for use of such threaded tubular components give rise to different types of loads, which makes it necessary to use films on sensitive portions of such components such as the threaded zones, abutting zones or sealing surfaces.

Thus, makeup operations are generally carried out under a high axial load, for example because of the weight of a tube several metres in length to be connected via the threaded connection, possibly aggravated by a slight misalignment of the axis of the threaded elements to be connected. This induces risks of galling at the threaded zones and/or at the metal/metal sealing surfaces. The threaded zones and the metal/metal sealing surfaces are routinely coated with lubricants.

Furthermore, the threaded tubular components are often stored then made up in a hostile environment. This is the case, for example, in an offshore situation in the presence of a saline mist or in an onshore situation in the presence of sand, dust and/or other pollutants. Thus, it is necessary to use films that combat corrosion on the surfaces which have to cooperate by makeup (threaded zones) or by interfering contact (metal/metal sealing surfaces and abutments).

Because of environmental standards, however, it appears that using greases conforming to API (American Petroleum Institute) standard RP 5A3 does not constitute a long-term solution because such greases can be extruded from the tubular components and released into the environment or into the well, resulting in plugging which necessitates special cleaning operations.

In order to overcome the problems of requiring a long-term corrosion resistance and resistance to galling and to satisfy environmental prerogatives, solid films which are dry (i.e. not pasty like greases), which are lubricating and which are protective have been developed.

In general, all dry films used on threaded systems for applications linked to drilling and working hydrocarbon wells are based on organic or inorganic matrixes.

A first response to satisfying the criteria for thermal stability and abrasion resistance under compressive and shear loads was provided by organic matrixes from the epoxy type thermoset resin family. Epoxy resins exhibit high toughness (90 MPa), high hardness (65 to 89 Shore D) and high compressive strength (>100 MPa). By combining the properties of the resin with solid $MoS_2$ or PTFE type lubricants, dry films comply with current anti-galling requirements. A suitable combination of organic binder and solid lubricant can ensure that the surfaces are separated for a sufficiently long period to prevent galling. Amorphous thermoset films have the advantage of offering a three-dimensional network structure by curing, thus providing them with considerable hardness. Examples which may be cited are those in documents WO2004033951 and WO2007063079 which disclose dry films which are rich in lamellar zinc dispersed in a minor epoxy resin as a keying and protective layer applied directly to the surface preparation.

Other solutions based on dry films based on PTFE type fluoropolymers in a major epoxy resin have been developed.

However, that type of film incorporating high proportions of mineral fillers are brittle in nature under load in a range of temperatures below their glass transition temperature.

In addition, using such organic resins necessitates using organic solvents to promote wetting and application. Said solvents are generally selected from the list comprising isopropyl alcohol, butyl acetate, xylene and toluene, and are currently restricted under new regulations linked to the environment. In fact, some are classified as "CMR substances" (carcinogenic, mutagenic, repro-toxic).

A second response detailed in document WO2001016516 which can be used to produce a certain mechanical, thermal and chemical resistance, proposes the use of matrixes of the solely inorganic polymer type. Advantageously, inorganic polymers such as alkoxy titanates, alkoxy zirconates and ethyl polysilicates form a dense three-dimensional cross-linked network and exhibit considerable adhesion to the metal surface. They can be heat resistant up to 1200° C. Other butyl polytitanate polymers incorporating solid lubricants such as $MoS_2$ have been identified as promoters for their anti-galling properties.

However, using such inorganic polymer type matrixes is based on producing them by two-stage mineral polymerization (hydrolysis and condensation) using sol-gel techniques which involve acid or alkaline catalysts as well as polar organic solvents (alcohols, ketones, hydrocarbons) the use of which is regulated under new environmental rules.

A third response has been envisaged, based on the use of thermoplastic acrylic resins or their copolymers in aqueous emulsion as described, for example, in document WO2007042231.

However, acrylic resins copolymerized with ethylene type monomers (styrene, vinyl or methacrylate ester) are primarily semi-crystalline. Thus, the behaviour under load is either elastomeric or rigid, but not sufficiently resistant to shear. In both cases, the properties of the solid lubricants are not sufficient to optimize anti-galling performance.

In order to overcome the environmental problems and to generate a readily applicable, adhesive, corrosion-protective and abrasion-resistant coating, the present invention proposes combining the properties of organic polymers and inorganic polymers in order to correct their respective shortcomings. The invention consists of producing a transfer layer from a solid lubricant system fixed to the surface via a composite with a mixed organo-mineral matrix which is both wear resistant and chemically stable to external challenges.

In particular, the present invention concerns a tubular element for drilling and/or working hydrocarbon wells, having an end comprising at least one threaded zone, characterized in that the end is at least partially coated with a dry film comprising a matrix comprising a mixture of at least one alkaline polysilicate and at least one semi-crystalline thermoplastic organic polymer.

Optional characteristics, which are complementary or substitutional, are described below.

The semi-crystalline thermoplastic organic polymer may be a styrene-acrylic copolymer.

The alkaline polysilicate may belong to the family defined by sodium polysilicates, potassium polysilicates and lithium polysilicates.

The polysilicate may be an alkaline potassium polysilicate with a $SiO_2/K_2O$ weight ratio in the range 1 to 3.5, preferably 2.5 or higher.

The weight ratio in the dry film between the alkaline polysilicate and the semi-crystalline thermoplastic organic polymer may be in the range 0.2 to 3.5, preferably 0.5 or lower.

The end coated with the dry film may have undergone a surface preparation of the type selected from the group formed by sand blasting, conversion treatments, electrolytic deposits and non-reactive treatments.

The dry film may further comprise at least one solid lubricant as a friction reducing agent, in a proportion by weight in the range 5% to 30%.

The solid lubricant may be selected from graphite, $Bi_2S_3$, $SnS_2$, secondary amide waxes and paraffin waxes.

The dry film may further comprise a corrosion inhibitor.

The dry film may further comprise colloidal silica.

The whole of said threaded zone may be coated with a dry film.

Said threaded end may comprise at least one sealing surface intended for metal/metal contact, and said sealing surface may be coated with lubricating dry film.

The invention also concerns a tubular connection for drilling and/or working hydrocarbon wells, comprising at least one tubular element having a threaded end which is at least partially coated with a lubricating dry film in accordance with the invention.

The invention also pertains to a method for producing a dry film on a threaded tubular component for drilling or working hydrocarbon wells, said tubular component having a threaded zone at one of its ends produced on its exterior or interior peripheral surface depending on whether the threaded end is male or female in type, characterized in that the method comprises the following steps:

producing a mixture comprising a dispersion or an aqueous emulsion of acrylic copolymers selected from styrene-acrylics, acrylic-methacrylates, styrene-acrylic-methacrylates, aliphatic polyurethane-acrylics, polyacrylates and vinyl acetate-ethylene-vinyl chloride type terpolymers, with a solution of alkaline polysilicates selected from potassium polysilicates, sodium polysilicates and lithium polysilicates;

applying said mixture in the liquid state by spraying onto one of the ends of said threaded tubular component at a temperature in the range 20° C. to 40° C.;

drying the end coated with the film at a temperature increasing from the mixture application temperature to a maximum of 80° C. over a period of at least 15 minutes;

densification of the film at a temperature in the range 80° C. to 160° C. for a period in the range 30 to 60 minutes.

The densification step may be followed by a hardening step at 160° C. for a period in the range 120 to 240 minutes.

The step for applying the mixture by spraying may be carried out at a temperature close to the temperature of the end of the threaded tubular component.

The step for producing the mixture between the dispersion or an aqueous emulsion of acrylic copolymers and the solution of alkaline polysilicates may be carried out at a pH of 9.5 or higher.

The dispersion or the aqueous emulsion of acrylic copolymers may comprise a thickener.

The dispersion or the aqueous emulsion of acrylic copolymers may comprise a stabilizer.

The dispersion or the aqueous emulsion of acrylic copolymers may comprise a coalescing agent.

The mixture of the dispersion or the aqueous emulsion of acrylic copolymers and the solution of alkaline polysilicates may comprise a hardener.

The mixture of the dispersion or an aqueous emulsion of acrylic copolymers and the solution of alkaline polysilicates may comprise a solid lubricant selected from graphite, $Bi_2S_3$, $SnS_2$, secondary amide waxes and paraffin waxes in a final proportion by weight in the range 5% to 30%.

The mixture between the dispersion or an aqueous emulsion of acrylic copolymers and the solution of alkaline polysilicates may comprise a corrosion inhibitor.

The mixture between the dispersion or an aqueous emulsion of acrylic copolymers and the solution of alkaline polysilicates may comprise colloidal silica.

The step for applying said mixture to one end of said threaded tubular component may be preceded by a step for surface preparation of the type selected from the group formed by sand blasting, conversion treatments, electrolytic deposits and non-reactive treatments.

The features and advantages of the invention will be described in more detail in the description which follows, made with reference to the accompanying drawings.

Figure 1:
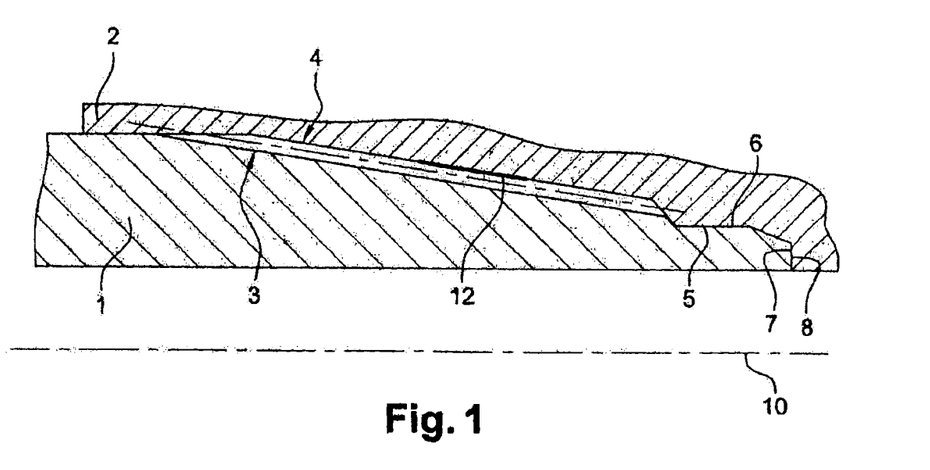
FIG. 1 is a diagrammatic view of a connection resulting from connecting two tubular components by makeup.

The threaded connection shown in FIG. 1 comprises a first tubular component with an axis of revolution 10 provided with a male end portion 1 and a second tubular component with an axis of revolution 10 provided with a female end portion 2. The two ends 1 and 2 each have a terminal surface which is disposed perpendicular to their respective axis of revolution 10 and are respectively provided with a threaded zone 3 and 4 which cooperate mutually for mutual connection of the two components by makeup. The threaded zones 3 and 4 may be of the trapezoidal, self-locking, or other thread type. Furthermore, metal/metal sealing surfaces 5, 6 intended to come into sealed interfering contact against each other after connecting the two threaded components by makeup are provided respectively on the male 1 and female 2 end portions close to the threaded zones 3, 4. The male end portion 1 has a terminal surface 7 which comes into abut- ment against a corresponding surface 8 provided on the female end portion 2 when the two components are made up one into the other.

In a variation, the abutment between the terminal surface 7 and the corresponding surface 8 may be replaced by self-locking interfering cooperation of the threaded zones 3, 4 of the type described, for example, in U.S. Pat. No. 4,822,081, US RE 30 647 or US RE 34467.

Figure 3:
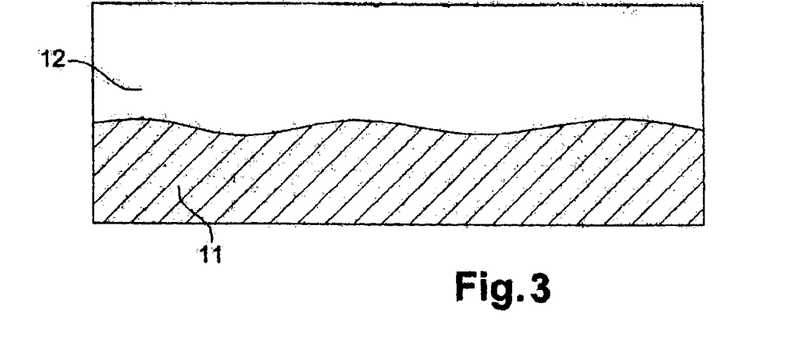
FIG. 3 is a diagrammatic view of a substrate coated with a lubricating dry film.

As can be seen in FIGS. 1 and 3, the end portion 1 or 2 of at least one of the tubular components is coated at least in part with a dry film 12 comprising a matrix constituted by a mixture of alkaline polysilicates and semi-crystalline thermoplastic organic polymers. The term "dry film" as used here means a solid film which is not tacky to the touch.

The advantage of alkaline polysilicates is that they exhibit a thermo-mechanical and tribological behaviour similar to that of a heat-cured epoxy resin. Further, in the case of thin films, alkaline polysilicates have the capacity to generate strong, preferential bonds with the surfaces because they are sufficiently polar. Although they have an amorphous structure, alkaline polysilicates are in the vitreous state if they are loaded in a temperature range below their glass transition temperature. This results in low viscoelasticity, i.e. high rigidity and low deformability of the material under load.

The figure below is a diagrammatic representation of the three-dimensional structure of an amorphous alkaline polysilicate:

Thus, it is necessary to plasticize them by associating them with a semi-crystalline thermoplastic organic polymer exhibiting a fragile-ductile transition temperature below the temperature of loading. The greater elasticity of said organic polymer increases the ability of the material to undergo plastic deformation and thus provides it with good shock and crack resistance. This technical effect is linked to the interlocking density of the molecular chains. The choice of monomers constituting the semi-crystalline thermoplastic organic polymers is thus important in achieving the required mechanical properties.

The figure below is a diagrammatic representation of the interlocking of the networks of organic and inorganic polymers.

Organic polymer network     Inorganic polymer network

Incerpenetrating polymer network

Advantageously and concerning the semi-crystalline thermoplastic organic polymers, the Applicant prefers acrylic copolymers in dispersions or in aqueous emulsions, and more particularly styrene-acrylics, acrylic-methacrylics, styrene-acrylic-methacrylics, and aliphatic polyurethane-acrylics. The Applicant also prefers dispersions or aqueous emulsions of polyacrylates and terpolymers such as vinyl acetate-ethylene-vinyl chloride, in an alkaline medium.

Advantageously, the Applicant prefers solutions of alkaline polysilicates such as potassium, sodium or lithium polysilicates with a $SiO_2/M_xO$ weight ratio of 2 or more, preferably more than 2.5.

The Applicant has also developed a method for forming an organic-inorganic matrix resulting from mixing a styrene-acrylic copolymer and a sodium, potassium or lithium polysilicate.

Solutions of sodium polysilicates and potassium polysilicates provide excellent adhesion to metals, film-forming power, corrosion resistance, excellent temperature resistance and finally, a high Mohs hardness equivalent to that of silica. The three-dimensional amorphous films of alkaline polysilicates obtained will be particular cohesive and hard.

Lithium polysilicates differ from traditional alkaline polysilicates as they combine the characteristics of both alkaline polysilicates and of colloidal silicas, namely they have a better bind, a better passivating effect in combination with phosphatation and a better barrier effect and cathodic protection effect by inhibiting the oxidation mechanism. Further, the $SiO_2/Li_2O$ ratio is more than 10, which means that the quantity of water necessary is less than that required for traditional alkaline polysilicates. However, they have poorer film-forming properties and as a result they have poorer adhesion to metals.

Concerning the method for obtaining a film, in addition to drying by evaporation, hardening is necessary to increase the moisture resistance. The nature of the hardening depends on the $SiO_2/M_xO$ weight ratio and may be chemical, by using a neutralizing agent (acid catalyst), or may be accomplished by heat treatment. As an example, a completely impermeable film may be obtained by a treatment at 600° C. in the presence of zinc oxide. A practically insoluble film consists of selecting a solution of potassium polysilicates rather than sodium polysilicates. The solution of potassium polysilicates should preferably be rich in silica. A solution of polysilicates for which the alkaline portion (potassium oxide) is too high would dehydrate slowly because of its high affinity for water. Evaporation must be slow between ambient temperature and 100° C. to prevent the formation of vapour at the interface, then followed by a heat treatment in the range 120° C. to 160° C., preferably above 200° C., for one to two hours to eliminate residual water.

Advantageously, the method may be catalyzed with an organic or mineral acid (sodium bicarbonate, aluminium hydroxide, aluminium triphosphate) to neutralize the alkaline portion responsible for the solubility in water. This neutralization can be carried out as a post-treatment by applying an acid solution by spraying.

Advantageously, it is preferable to have a high $SiO_2/M_xO$ weight ratio to guarantee impermeability. However, a solution with a low $SiO_2/M_xO$ weight ratio has better toughness and elasticity as well as reduced brittleness. When a solution of alkaline polysilicates with a low $SiO_2/M_xO$ weight ratio is selected, an alternative consists of enriching the solution in colloidal silica to conserve the initial properties and reduce the alkaline portion.

The films can be applied without temperature constraints, but above all they are sufficiently flexible and deformable when the inorganic binder is combined with a plasticizer. The term "plasticizer" means a substance which, when incorporated into polymers, partially destroys the interactions between the chains responsible for mechanical cohesion and transforms an initially rigid material into a supple, flexible material.

The plasticizer for the solution of alkaline polysilicates is an organic resin selected from styrene-butadienes, polystyrenes, neoprenes, polyvinyl chlorides, polyvinyl acetates and acrylic polymers, preferably a styrene-acrylic copolymer.

In the case of sodium and potassium polysilicates, the relative proportion with respect to the plasticizer may be such that the inorganic polymer is in the majority. In contrast, lithium polysilicate is necessarily in the minor proportion.

Clearly, the lubricating dry film 12 may be applied to the threaded zones in different ways.

The lubricating dry film 12 may cover all or a portion of the threaded zone 3,4.

The lubricating dry film 12 may cover all or a portion of the metal/metal sealing surface 5, 6.

The tests consisted of evaluating a certain number of parameters, in particular:
 makeup tests;
 the adhesive force and the coefficient of friction on the substrate (Scratch test);
 the cross hatch test;
 the resistance to corrosion under moist conditions;
 the resistance to immersion in water.

The makeup tests allowed the evaluation of the torque on shoulder resistance CSB, also known as the ToSR. This torque arises during makeup operations specific to "premium" connections used in the oil industry.

Figure 2:
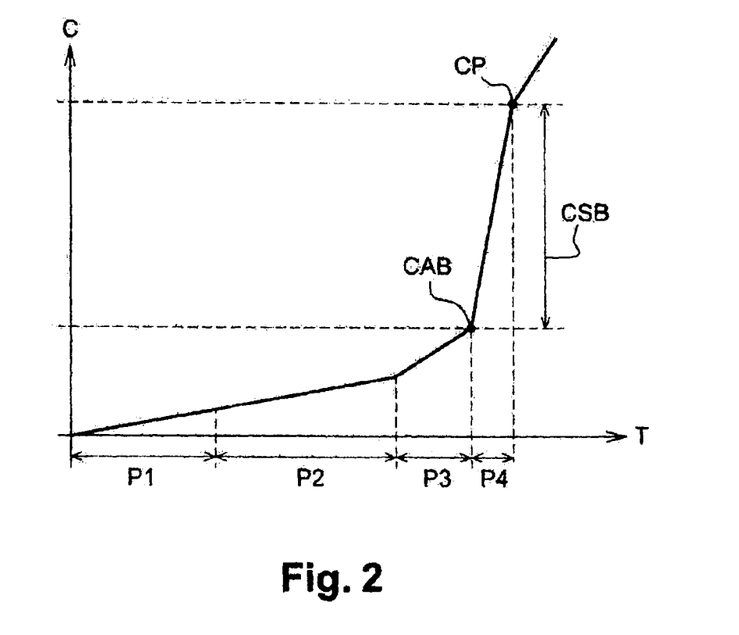
FIG. 2 is a diagrammatic view of a makeup curve for two threaded tubular components.

The curve in FIG. 2 expresses the makeup (or clamping) torque as a function of the number of rotational turns made. As can be seen, a profile for the makeup torque of "premium" connections can be broken down into four portions.

In a first portion P1, the external threads of the male threaded element (or pin) of a first component of a threaded tubular connection as yet have no radial interference with the internal threads of the corresponding female threaded element (or box) of a second component of the same threaded tubular connection.

In a second portion P2, the geometrical interference of the threads of the male and female threaded elements generates a radial interference which increases as makeup continues (generating a small but increasing makeup torque).

In a third portion P3, a sealing surface at the external periphery of the end portion of the male threaded element interferes radially with a corresponding sealing surface of the female threaded element to produce a metal/metal seal.

In a fourth portion P4, the front end surface of the male threaded element is in axial abutment with the annular surface of a makeup abutment of the female threaded element. This fourth portion P4 corresponds to the terminal phase of makeup.

The makeup torque which corresponds to the end of the third portion P3 and to the start of the fourth portion P4 is termed the shouldering torque (CAB).

The makeup torque which corresponds to the end of the fourth portion P4 is termed the plastification torque (CP). Beyond this plastification torque CP, it is assumed that the male makeup abutment (end portion of the male threaded element) and/or the female makeup abutment (zone located behind the annular abutment surface of the female threaded element) is (or are) subjected to plastic deformation, which may degrade performance as regards the tightness of the contact between the sealing surfaces by plastification of the sealing surfaces as well.

The difference between the values for the plastification torque CP and the shouldering torque CAB is termed the torque on shoulder resistance CSB: CSB=CP−CAB. A threaded tubular connection has an optimized interference fit at the end of makeup, which is the guarantee for optimum mechanical strength of the threaded connection, for example as regards tensile forces, but also as regards accidental break-out in service, and for optimized sealing performances.

The designer of a threaded connection is thus obliged to define, for a given type of threaded connection, a value for the optimum makeup torque which, for all connections of this type of connection, must be lower than the plastification torque CP (in order to avoid plastification of the abutments and the resulting disadvantages) and be higher than the shouldering torque, CAB. Ending makeup with a torque which is less than the CAB cannot guarantee correct relative positioning of the male and female elements and thus of an effective interference fit between their sealing surfaces. Furthermore, there is a risk of break-out. The effective value of the shouldering torque CAB can fluctuate greatly from one connection to another for the same type of connection as it depends on the diametric and axial machining tolerances of the male and female threads and sealing surfaces. The optimized makeup torque should be substantially higher than the shouldering torque CAB.

The higher the value of the torque on shoulder resistance CSB, the larger the margin for defining the optimized makeup torque, and the more the threaded connection will be resistant to operational stresses.

Figure 4:
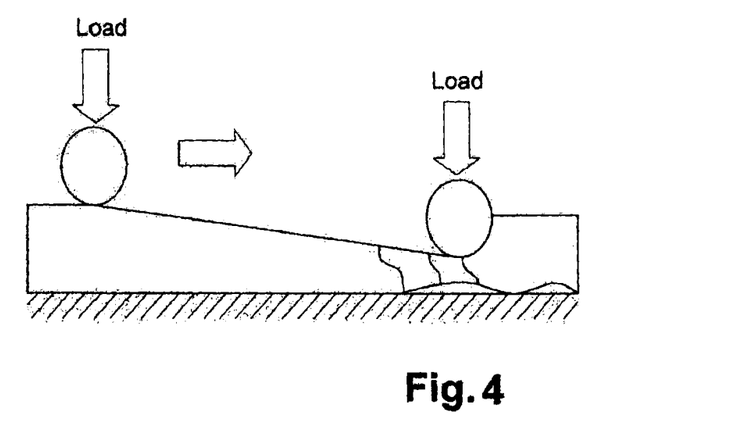
FIG. 4 is a diagrammatic view of a test set-up.

The Scratch test, shown diagrammatically in FIG. 4, allows the adhesive force or adhesion of a film on a surface or surface preparation to be determined. This method, consisting of shearing and deforming a film with a spherical bead subjected to an increasing load, also allows two major tribological parameters related to wear resistance to be determined, namely the coefficient of friction and the critical load corresponding to the appearance of a loss of film cohesion.

The experimental conditions employ a spherical indenter formed from Inconel 718 with a diameter of 5 mm and a metal specimen formed from carbon steel or Z20C13 with a roughness Ra of less than 1 micrometre, as well as the following parameters: a load increasing from 10 N to 310 N (with a load increase rate of 15 N/s), a rate of displacement of the bead of 2 mm/s, a duration of 20 s and a track length of 40 mm.

The cross hatch test consists of determining the resistance of a mono- or multi-layer coating to being separated from a substrate when the coating is cross-hatched by making incisions up to said substrate, in accordance with a classification into six categories. Excellent adhesion of the coating to the substrate must correspond to class 0 of ISO standard 2409 (2007): perfectly smooth edges to the incisions, none of the cross hatch squares detached. In order to take the environment into account, the cross hatch test is carried out after being placed in a moist medium (35° C. and 90% RH). No change in appearance, no blistering, no corrosion, no cracking, no flaking corresponding to the classifications in ISO standard 4628, and no loss of adhesion are characteristics of good moisture resistance.

The moist medium corrosion tests consist of a neutral saline mist test carried out in a climatic chamber at a temperature of 35° C. with a 50 g/L saline solution with a density in the range 1.029 to 1.036 at 25° C., with a pH in the range 6.5 to 7.2 at 25° C. and recovered at a mean rate of 1.5 mL/h. Specimens that are intact with no rusting then have to correspond to the ReO class of ISO standard 9227 after exposure. The method provides a means of verifying that the comparative quality of a metallic material with or without a protective film (metallic or organic coating on metallic material) against corrosion is maintained. The water resistance tests consist of subjecting the specimens to an accelerated corrosion test in accordance with DIN standard 50017 carried out in a climatic chamber. This test, comprising one cycle per day, consists of depositing water vapour by condensation under the following conditions: 35° C., 90% relative humidity for 8 hours, then allowing the specimen to dry. After 7 cycles, a check is made to see whether the substrate protected by the coating has corroded.

Excellent resistance must correspond to the classifications in ISO standard 4628, namely: no corrosion, no blistering, no cracking, nor flaking of a carbon steel plate treated by phosphatation with zinc (8 to 20 $g/m^2$ deposit of phosphate) or treated with an electrolytic deposit of a ternary Cu—Sn—Zn alloy with an intermediate layer of Ni.

Immersion in water on storage or in operation contributes to degrading the coatings as a function of defects in the coating per se, to contamination of the substance or to inadequate preparation of the surface. The immersion test for ASTM standard D870 qualitatively and quantitatively evaluates the resistance of the coating to modes of degradation of the portion immersed in demineralized water at 40° C. for 168 hours. Excellent resistance must correspond to the classifications in ISO standard 4628, i.e. no corrosion, no blistering, no cracking, nor flaking on a carbon steel plate treated by zinc phosphatation (deposited in an amount of 8 to 20 $g/m^2$ of phosphate) or treated with an electrolytic deposit of a ternary Cu—Sn—Zn alloy with an intermediate layer of Ni. Excellent resistance must also correspond to a small variation in the adhesion at the interface and/or the coefficient of friction measured by the Scratch test compared with the non-immersed portion.

In particular, the Applicant has evaluated the combination of potassium, sodium and lithium alkaline polysilicates marketed by the supplier WOELLNER under the trade name BETOL® and a semi-crystalline thermoplastic organic polymer selected from dispersions or aqueous emulsions of acrylic resins which are highly compatible with the inorganic polymers in solution (at a pH of close to 11). The pH compatibility is linked to the saponification index, and so the acrylic resin has to be sufficiently resistant to saponification in a highly alkaline medium. A low resistance to saponification would result in a gel, and film formation could be affected. A saponification index, corresponding to the mass of potash (KOH)—in mg—necessary for neutralizing the free fatty acids and to saponify the fatty acids combined in one gram of fat, of more than 48 mg KOH/g is particularly recommended. Of the acrylic resins, only styrene-acrylic copolymers have an adequate saponification index, in particular styrene-butyl acrylate copolymers (100 and 180 mg KOH/g). The styrene-acrylic copolymers which were evaluated, in dispersion or in aqueous emulsion, were supplied by BASF with the trade name ACRONAL® or by ROHM & HAAS with the trade name MAINCOTE®.

Regarding the production method, formulating a hybrid organic/inorganic matrix consisted of diluting the organic polymer in water then slowing adding the alkaline polysilicate with stirring. It is then recommended that the solution of alkaline polysilicates be considerably diluted in order to limit the reactivity, and to control the order of incorporation. Since they are naturally less hygroscopic, potassium polysilicates are preferred to sodium polysilicates for the purposes of the study. In fact, the potassium or sodium alkaline portion forms carbonates with $CO_2$, and $K_2CO_3$ is less hygroscopic than $Na_2CO_3$.

To stabilize the preparations, it was necessary to add coalescing agents, stabilizers, dispersing agents and thickeners. Other major precautions consisted of avoiding any risk of flocculation or precipitation of silicic acid by controlling the pH or avoiding incompatibilities in an alkaline medium, especially with amphoteric substances such as alumina. The critical pigment volume (CPV) was particularly important in guaranteeing the impermeability of the film, to limit porosities, the risk of blistering and initiating the corrosion mechanism.

The use of alkaline polysilicates also necessitated controlling the film formation mechanism, in particular by promoting dehydration and also densification of the three-dimensional network (network alternating zeolite and silica gel phases), by means of a hardener. Concomitant neutralization and precipitation during densification allowed a film to be obtained which was sufficiently impermeable to moisture and relatively insoluble, by ensuring complete elimination of water by means of an appropriate heat treatment.

Application was carried out using a pneumatic spray system with a gravity feed gun. The temperatures of the mixture and the substance were preferably adjusted to the film formation temperature of the organic binder, i.e. in the range 20° C. to 40° C. depending on the styrene-acrylic copolymers used.

Pre-drying at the application temperature for a period of 5 minutes has advantageously been recommended and followed by drying for 10 minutes, increasing the temperature from the application temperature to 80° C.

It will be recalled that densification of the network for inorganic polymers and particularly for alkaline polysilicates is carried out in the range 80° C. to 160° C. in the case in which the relative humidity is insufficient, preferably in the range 120° C. to 160° C., for a period in the range 30 minutes to 60 minutes.

Final hardening at 160° C. may advantageously be carried out for a period in the range 120 to 240 minutes in order to completely eliminate residual water.

The dry films were produced on carbon steel or low alloy steel samples with or without a surface treatment, such as phosphatation in the case of a carbon steel or an electrolytic deposit of Cu—Sn—Zn comprising a primer of Wood nickel in the case of a light alloy steel. The thicknesses of the dry films studied were preferably in the range 30 to 50 µm.

Firstly, the Applicant evaluated, by means of the Scratch test, the wear resistance under increasing load of various dry films of alkaline polysilicates supplied under the trade name BETOL®.

The Applicant evaluated the adhesion of these various films, under humid conditions as well, using the ISO 2409 cross hatch test.

Table 1 shows that a wide variety of $SiO_2/K_2O$ weight ratios was tested on a carbon steel coated by zinc phosphatation in order to determine the optimum $SiO_2/K_2O$ weight ratio.

TABLE 1

| Product name | $SiO_2/K_2O$ weight ratio | Sample A | Sample B | Sample C |
|---|---|---|---|---|
| BETOL K42 | 1.9 | 100% | — | — |
| BETOL K35 | 2.2 | — | 100% | — |
| BETOL K28 | 2.5 | — | — | 100% |

TABLE 1-continued

| Product name | $SiO_2/K_2O$ weight ratio | Sample A | Sample B | Sample C |
|---|---|---|---|---|
| Scratch test | Critical load: Lc(N): | 165 | 105 | 138 |
| Cross hatch test | Adhesion class: | 0 | 0 | 0 |
| Cross hatch test after immersion | Adhesion class: | 4 | 4 | 0 |

It is preferable to have a high weight ratio in order to guarantee impermeability. However, a solution with a low weight ratio has better toughness and elasticity as well as reduced brittleness.

Secondly, the Applicant evaluated the best performing aqueous dispersions or aqueous emulsions of acrylic copolymers, still using the Scratch test and the cross hatch test. The dry films were produced on carbon steel samples coated with a Cu—Sn—Zn electrolytic deposit.

TABLE 2

| Chemical nature | Critical load: Lc(N) | Adhesion class |
|---|---|---|
| Styrene-acrylic copolymers | 150-272 | 0 |
| Acrylic methacrylate copolymers | 38-50 | 0/1 |
| Styrene-acrylic methacrylate copolymers | 97 | 0 |
| Polyurethane-acrylic copolymers | 228 –> 310 | 0 |

According to the results of Table 2, it appears that the styrene-acrylic copolymers and the polyurethane-acrylic copolymers have the best viscoelastic behaviour and thus the best break strength under shear-compressive loading. The selected matrixes are thus preferably based on mixtures of potassium polysilicates and styrene-acrylic copolymers or polyurethane-acrylic copolymers.

Table 3 illustrates the increase in performance for a film with an organic-inorganic matrix comprising a styrene-acrylic copolymer and an alkaline polysilicate on a carbon steel sample coated with a Cu—Sn—Zn electrolytic deposit. The comparison was made with respect to a dry film based solely either on an alkaline polysilicate or on a styrene-acrylic copolymer.

Sample F (Sample F) resulted from a dispersion of a thickener in water followed by adding a stabilizer. After mixing with an aqueous dispersion of styrene-acrylic copolymers, a coalescing agent selected from propylene glycol ethers was added. After pre-diluting the potassium polysilicate solution, it was added to the dispersion, very slowly with stirring, checking that the pH remained at 9.5 or higher. The organic-inorganic weight ratio was fixed at 0.2.

TABLE 3

| Product name | Nature/chemical function | Sample D | Sample E | Sample F |
|---|---|---|---|---|
| Water | — | — | — | 24% |
| Laponite RDS | Thickener/hardener (10% solution) | — | — | 6% |
| Betolin Q40 | Stabilizer | — | — | 0.5% |
| ACRILEM IC26 | Aqueous dispersion of styrene-acrylic copolymer (42% solids) | — | 100% | 10% |
| BETOL K28 | $SiO_2/K_2O$ = 2.5 | 100% | — | 59% |
| Betolin A11 | Viscosity regulator | — | — | 0.5% |
| Scratch test | Critical load: Lc(N): | 138 | 150 | >310 |
| Scratch test | COF (10-310N): | 0.6 | 0.26 | 0.22 |

Sample F exhibited interesting viscoelasticity under load, in contrast to the brittle and abrasive behaviour of sample D (alkaline polysilicate) in semi-open contact.

Advantageously and in order to improve friction, the samples Sample G and Sample H included added solid lubricants, preferably lamellar (class 1) and reactive (class 2). Table 4 summarizes the results relating to the Scratch tests.

The solid lubricants could be selected from the following list: graphite, $Bi_2S_3$, $SnS_2$, secondary amide wax, paraffin wax. It should be noted that solid lubricants comprising fluorine atoms are precluded due to their reactivity in a highly alkaline medium.

TABLE 4

| Product name | Nature/chemical function | Sample G | Sample H |
|---|---|---|---|
| Water | — | 23.2 | 23.2 |
| Laponite RDS | Thickener/hardener (10% solution) | 5.4 | 5.4 |
| Sapetin D27 | Dispersing agent | 0.5 | 0.5 |
| Betolin Q40 | Stabilizer | 0.5 | 0.5 |
| Austro Tec Bis84 | $Bi_2S_3$ | 2.2 | 2.2 |
| Timrex KS4 | Graphite | 0.5 | 0.5 |
| Printex 60 | Carbon black | 0.8 | 0.8 |
| Baikalox CR125 | Alumina | 1.1 | 1.1 |
| Aquasuperslip 6550 | Aqueous dispersion of secondary amide and polyolefin | 0.3 | 0.3 |
| MAINCOTE 1071 | Aqueous dispersion of styrene-acrylic copolymer (50% solids) | 8 | 10.5 |
| BETOL K28 | $SiO_2/K_2O$ = 2.5 | 56 | 54.5 |
| Betolin A11 | Viscosity regulator | 0.5 | 0.5 |
| Organic/inorganic weight ratio: | | 0.25 | 0.3 |
| CPV: | | 8% | 8% |
| Scratch test | Critical load: Lc(N): | >310 | >310 |
| Scratch test | COF (10-310N): | 0.14 | 0.11 |

In Table 5, the Applicant summarizes a certain number of recommendations for obtaining optimized films.

Hence and advantageously, an organic/inorganic weight ratio of at least 0.3 is more favourable, at equal critical pigment volume, for ensuring low friction. However, the water resistance is not entirely assured, with persistent blistering and protection against corrosion of the surface of less than 48 hours. In fact, the incompatibility between an alumina with an amphoteric nature and potassium polysilicate in an alkaline medium is not of a nature that can densify the three-dimensional network.

ratio of close to 0.3 and a ratio of 2 between reactive lamellar solid lubricants of class 2 and plastically deformable solid lubricants of class 4. The water resistance was strengthened for a CPV of more than 30%.

Regarding the definition of solid lubricants from classes 2 and 4, reference should be made to patent application FR 2 892 174, hereby incorporated by reference.

It is also advantageous to reinforce the "water-repellent" properties by limiting the water take-up of the film formed by means of a modified polysiloxane emulsion.

TABLE 5

| Product name | Nature/chemical function | Sample I (%) | Sample J (%) | Sample K (%) |
|---|---|---|---|---|
| Water | — | 30 | 23.2 | 23.2 |
| Betolin V30 | Thickener | 0.1 | 0.1 | 0.1 |
| Walocel CRT1000P | Thickener | 0.1 | 0.3 | 0.1 |
| Sapetin D27 | Dispersing agent | 0.5 | 0.4 | 0.3 |
| Betolin Q40 | Stabilizer | 0.4 | 0.6 | 0.4 |
| AustroTec Bis84 | $Bi_2S_3$ | 7.9 | 11.2 | 6.5 |
| Printex 60 | Carbon black | 1.3 | 0.3 | 1.1 |
| Microspersion 528 | Aqueous dispersion of secondary amide wax | 3.9 | 8.2 | 3.2 |
| Martinal OL-107LEO | Aluminium hydroxide | 5.6 | 2.8 | 4.7 |
| Betol KS402A | Colloidal silica in ammonium hydroxide | 5.6 | 2.8 | 4.7 |
| Betolin AH250 | Emulsion of modified polysiloxane | 1.3 | 1.4 | 1.1 |
| ACRONAL S559 | Aqueous dispersion of styrene-acrylic copolymer (50% solids) | 42 | 8.4 | 8.7 |
| BETOL K28 | $SiO_2/K_2O = 2.5$ | — | 27.9 | 46.4 |
| Betolin A11 | Viscosity regulator | 0.7 | 0.7 | 0.5 |
| Organic/inorganic weight ratio: | | — | 0.6 | 0.3 |
| CPV: | | 24% | 32% | 26% |
| Scratch test | Critical load: Lc(N): | 85 | 402 | 740 |
| Scratch test | COF (10-310N): | 0.19 | 0.09 | 0.09 |
| After immersion (observations): | | Blistering 5S5 | RAS | Blistering 3S2 |

Advantageously, an aluminium hydroxide type hardener is highly appropriate for a heat treatment at close to 600° C. Thus, it is appropriate to optimize the formulations.

In the same manner as the hardener, because of their high saponification index, styrene-acrylic copolymers participate in neutralizing the alkaline portion of the alkaline polysilicates during evaporation. Samples J and K perfectly illustrate the overall enhancement in performances using a styrene-butyl acrylate copolymer and aluminium hydroxide as a hardener.

Similarly, the glass transition temperature of butyl acrylate monomer provides the copolymer with greater flexibility, facilitating film formation even at temperatures below 10° C.

Finally, the total fraction of potassium polysilicates was reduced in order to increase the CPV of the film and its water resistance.

The Applicant has also established that it was possible to optimize the performance of a film with an acrylic-alkaline polysilicate matrix by adding colloidal silica. Adding colloidal silica can, inter alia, adjust the pH to facilitate the dispersion of the fillers. More particularly, colloidal silica contributes to reducing the overall alkalinity in the presence of alkaline polysilicate by modifying the $SiO_2/M_2O$ ratio. Finally, colloidal silica contributes to reducing the fraction of alkaline polysilicate in order to provide optimized critical pigment volumes.

The Applicant has also verified that the mechanical properties of the film are maximized for an organic/inorganic The Applicant also established that the resistance of the film and the coefficient of friction of an organic-inorganic composition described by means of the Scratch test are comparable to the performance recorded for thermoset coatings of the fluoroethane type such as those described in the document WO2011076350.

The Applicant also carried out makeup-breakout tests (see the curve in FIG. 2) on a connection partially coated with an organic-inorganic dry film in accordance with the invention, and on a reference connection partially coated with a solely organic dry film.

To this end, a dry film based on an organic-inorganic composition consisting of 23.2% water, 5.4% Laponite RDS (10% solution), 0.5% Sapetin D27, 0.5% Betolin Q40, 2.2% AustroTec Bis84, 0.5% Timrex KS4, 0.8% Printex 60, 1.1% Baikalox CR125, 0.3% Aquasuperslip 6550, 10.5% MAINCOTE 1071, 54.5% BETOL K28, 0.5% Betolin A11, was applied to the female end 2 of a 7" 29# CS L80 VAMTOP HT HH PFBS type connection with a surface preparation consisting of an electrolytic Cu—Sn—Zn deposit. The male end 1 was coated with a UV curable acrylic-epoxy resin as described in patent WO2006104251 with a zinc phosphatation type surface preparation.

Concerning the reference connection, a dry film based on an organic composition of styrene-acrylic polymer was applied to the female end 2 and the male end 1 of a 7" 29# CS L80 VAMTOP HT HH PFBS type connection with a surface preparation consisting of a zinc or manganese phosphatation.

The makeup torque applied to the connection coated with organic-inorganic film was raised to 29900 N·m as opposed to 20100 N·m for the makeup torque applied to the reference connection. The value of the shouldering torque was evaluated at between 12000 and 13000 N·m for the connection coated with organic-inorganic film, as opposed to 16000 N·m for the reference connection, even though the contact pressures in the threading were lower.

In conclusion, dry films based on an organic-inorganic composition of the invention can be used to increase the number of makeup/breakout operations by at least 50% compared with an organic matrix dry film.

In general, the combination of the properties of organic polymers and the properties of inorganic polymers in an individual dry film means that the following can be increased:
- sliding at the interface of the frictional surfaces by increasing the hardness by means of a stable amorphous mineral at the surface associated with a suitable quantity of added solid lubricant;
- adhesion, even under moist conditions, to carbon steel surfaces or even to light alloy steel surfaces with or without a surface preparation using reactive inorganic polymers;
- mechanical resistance, by associating the rigidity and hardness of the inorganic polymer with the flexibility of an organic polymer;
- longevity compared with a completely mineral surface preparation of the zinc phosphate type obtained by seeding then crystallization due to an increase in the actual contact surface area.

In addition, independently of this lubrication performance, the present invention performs in this manner under critical temperature and moisture conditions and because of its excellent keying properties to various surfaces or surface preparations, it provides a novel response adapted to the development of mono-layer systems which act both as a primer and a top-coat.

The invention claimed is:

1. A method for producing a dry film comprising a matrix on a threaded tubular component for drilling or working hydrocarbon wells, the method comprising:
    applying a mixture comprising a dispersion or an aqueous emulsion of a semi-crystalline thermoplastic acrylic copolymer selected from the group consisting of one or more of a styrene-acrylic, an acrylic-methacrylate, a styrene-acrylic-methacrylate, an aliphatic polyurethane-acrylic, a polyacrylate, and a vinyl acetate-ethylene-vinyl chloride terpolymer, with a solution of a potassium polysilicate having a $SiO_2/K_2O$ weight ratio that is 2.5 to 3.5 onto a threaded end of the threaded tubular component by spraying said mixture in a liquid state at a mixture application temperature of from 20° C. to 40° C. onto said threaded end, thereby obtaining a threaded end coated with a film;
    drying the threaded end coated with the film at a temperature that is greater than the mixture application temperature to a maximum of 80° C. for a period of at least 15 minutes; and
    densifying the film at a temperature of from 80° C. to 160° C. for a period of from 30 to 60 minutes to produce said dry film comprising a matrix,
    wherein
    depending on whether the threaded end is male or female, a threaded zone is provided on an exterior, if male, or an interior, if female, peripheral surface of the threaded end.

2. The method according to claim 1, further comprising:
    after said densifying, hardening the film at 160° C. for a period of from 120 to 240 minutes.

3. The method according to claim 1 wherein said applying is carried out at a temperature close to a temperature of the threaded end.

4. The method according to claim 1, wherein said mixture has a pH of 9.5 or higher.

5. The method according to claim 1, wherein the dispersion or the aqueous emulsion of the acrylic copolymer comprises a thickener.

6. The method according to claim 1, wherein the dispersion or the aqueous emulsion of the acrylic copolymer comprises a stabilizer.

7. The method according to claim 1, wherein the dispersion or the aqueous emulsion of the acrylic copolymer comprises a coalescing agent.

8. The method according to claim 1, wherein the mixture further comprises a hardener.

9. The method according to claim 1, wherein the mixture further comprises a solid lubricant selected from the group consisting of graphite, $Bi_2S_3$, $SnS_2$, a secondary amide wax, and a paraffin wax in a final proportion by weight of from 5% to 30%.

10. The method according to claim 1, wherein the mixture further comprises a corrosion inhibitor.

11. The method according to claim 1, wherein the mixture further comprises colloidal silica.

12. The method according to claim 1, further comprising:
    before said applying, preparing the threaded end by a surface preparation selected from the group consisting of sand blasting, a conversion treatment, an electrolytic deposit and a non-reactive treatment.

13. The method according to claim 1, wherein a thickness of the dry film is 30 to 50 μm.

14. The method according to claim 1, wherein said potassium polysilicate has a $SiO_2/K_2O$ weight ratio of 2.5.

15. The method according to claim 1, wherein a weight ratio in the dry film between the potassium polysilicate and the acrylic copolymer is 0.2 to 3.5.

16. The method according to claim 1, wherein a weight ratio in the dry film between the potassium polysilicate and the acrylic copolymer is 0.2 to 0.5.

17. The method according to claim 1, wherein the dispersion or aqueous emulsion is a dispersion or aqueous emulsion of a semi-crystalline thermoplastic acrylic copolymer selected from the group consisting of one or more of a styrene-acrylic and a styrene-acrylic-methacrylate.

18. The method according to claim 1, wherein the dispersion or aqueous emulsion is a dispersion or aqueous emulsion of a semi-crystalline thermoplastic acrylic copolymer which is a styrene-acrylic.

19. The method according to claim 1, wherein:
    said threaded end has an optionally surface-treated carbon steel or low alloy steel contact surface optionally subjected to a surface preparation selected from the group consisting of sand blasting, a conversion treatment, an electrolytic deposit, and a non-reactive treatment, and,
    said mixture is applied directly to said optionally surface-treated carbon steel or low alloy steel contact surface optionally subjected to said surface preparation.

20. A method for producing a dry film comprising a matrix on a threaded tubular component for drilling or working hydrocarbon wells, the method comprising:
    applying a mixture comprising a dispersion or an aqueous emulsion of a semi-crystalline thermoplastic acrylic copolymer selected from the group consisting of one or more of a styrene-acrylic, a styrene-acrylic-methacrylate, and an aliphatic polyurethane-acrylic, with a solution of a potassium polysilicate having a $SiO_2/K_2O$ weight ratio that is 2.5 to 3.5 onto a threaded end of the threaded tubular component by spraying said mixture in a liquid state at a mixture application temperature of from 20° C. to 40° C. onto said threaded end, thereby obtaining a threaded end coated with a film;

drying the threaded end coated with the film at a temperature that is greater than the mixture application temperature to a maximum of 80° C. for a period of at least 15 minutes; and densifying the film at a temperature of from 80° C. to 160° C. for a period of from 30 to 60 minutes to produce said dry film comprising a matrix, wherein depending on whether the threaded end is male or female, a threaded zone is provided on an exterior, if male, or an interior, if female, peripheral surface of the threaded end, and wherein a thickness of the dry film is 30 to 50 μm.

* * * * *